Sept. 7, 1937.　　　　G. C. FARMER　　　　2,092,414

BRAKE VALVE HANDLE

Filed Dec. 31, 1936

INVENTOR
GEORGE C. FARMER
BY Wm. N. Cady
ATTORNEY

Patented Sept. 7, 1937

2,092,414

UNITED STATES PATENT OFFICE 2,092,414

BRAKE VALVE HANDLE

George C. Farmer, Beverly, Ill., assignor to The Westinghouse Air Brake Company, Wilmerding, Pa., a corporation of Pennsylvania Application December 31, 1936, Serial No. 118,551

13 Claims. (Cl. 303—56)

This invention relates to handle devices for controlling the operation of brake valve devices or the like and more particularly to handle devices of the type in which the release of the handle device by the operator causes an emergency application of the brakes to be effected on the car or cars of a train.

Handles of the above type are provided to ensure that a car or train will be stopped and avoid possibly damaging or wrecking thereof in case the operator should fall dead or otherwise become incapacitated and unable to control the car. However, if when an operator becomes incapacitated he should fall on the handle, or his clothes should catch on the handle and act to hold the handle depressed, an application of the brakes will be prevented.

The principal object of the invention is to provide an improved safety handle device of the above type adapted to operate to cause an emergency application of the brakes to be effected on a car or cars of a train even though the operator should fall on the handle or his clothes should catch in the handle as above described.

Figure 1:
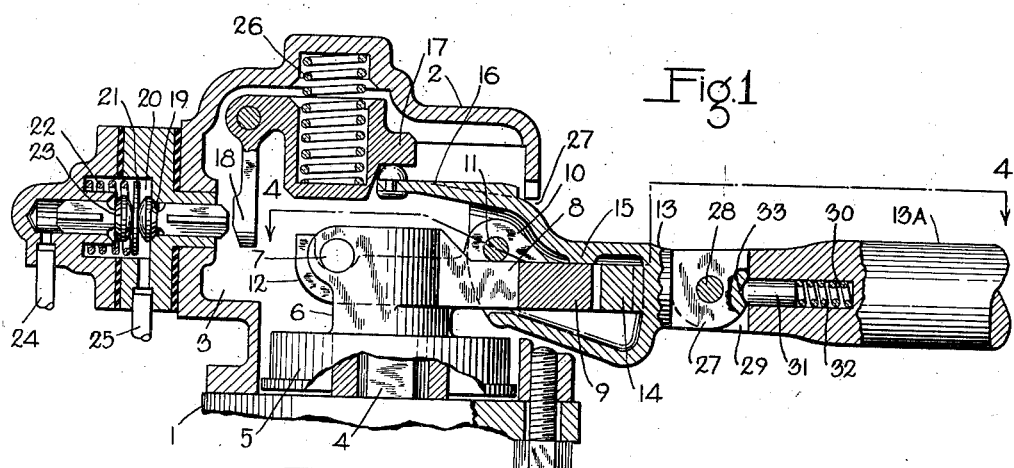
Figure 2:
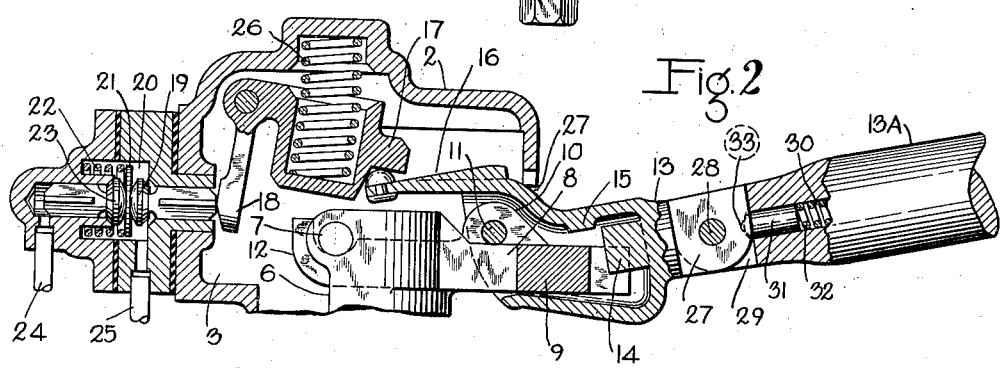
Figure 3:
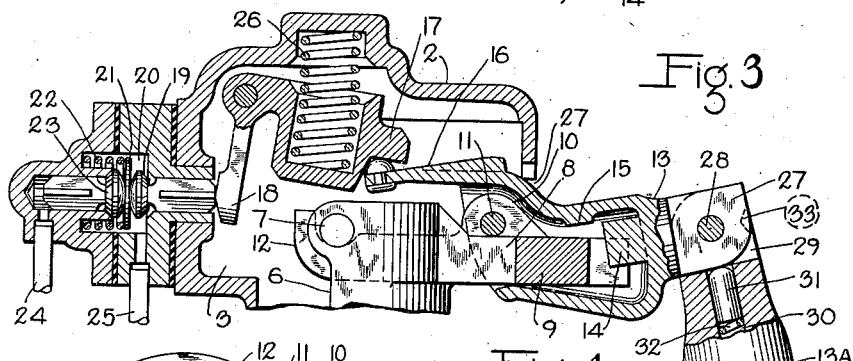
Figure 4:
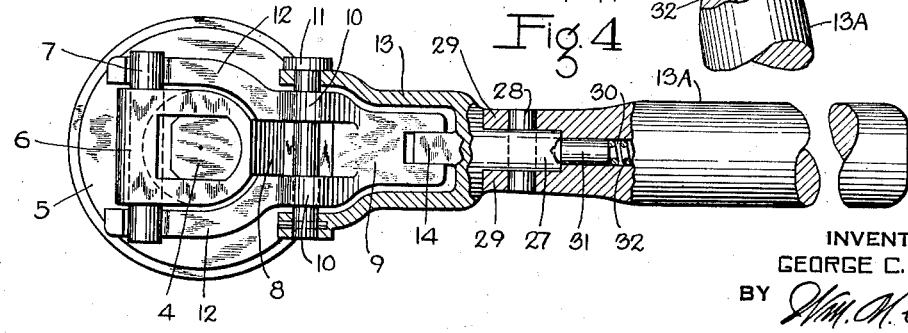

In the accompanying drawing; Fig. 1 is a vertical sectional view of a handle device applied to a brake valve device and embodying the invention, the handle being shown in its normal depressed position; Fig. 2 is a view similar to Fig. 1 and showing the handle in its released position; Fig. 3 is a view similar to Fig. 2 showing the handle in its released position as assumed if an operator, upon becoming incapacitated, should fall on the handle or otherwise tend to hold the handle depressed; and Fig. 4 is a view, mainly in section taken on the line 4—4 in Fig. 1.

The handle device shown in the drawing for the purpose of illustrating an application of the invention is substantially the same, as that disclosed in Patent No. 1,660,483 issued to Clyde C. Farmer on February 28, 1928, and the following description of said handle device will therefore be limited to only that deemed necessary to a comprehensive understanding of the invention.

As shown in the drawing, the reference character 1 indicates the upper portion of the casing of a brake valve device of the usual type adapted to effect control of the brakes on a car by the manipulation of a handle. A cover 2 is secured to the casing 1 and has a chamber 3, and extending upwardly from the casing 1 into said chamber is the usual brake valve operating key 4. An operating member 5 is mounted on the key 4 in chamber 3 and has driving engagement therewith. The member 5 has an upwardly extending sleeve like portion 6 carrying at one side a transversely disposed pin 7 and having at the opposite side an operating tongue 8.

The tongue 8 extends into a corresponding slot provided in a yoke member 9. The yoke member 9 is provided with lugs 10 in which there is disposed a pin 11 which engages the upper face of tongue 8, and said yoke member has arms 12 near the ends of which are provided half-round bearings adapted to engage the under surface of the pin 7.

An operating handle comprising two sections 13 and 13A is provided, the section 13 being pivotally mounted on the pin 11 and having a vertically disposed tongue 14 received in a corresponding slot in the end of the yoke 9. By this construction it is evident that the handle 13, 13A is movable vertically about the pin 11 relative to the yoke 9. A boss 15 is provided in the handle section 13 adapted to engage the yoke 9 for limiting movement of the handle in a downward direction and for thereby defining the normal or depressed position of the handle shown in Fig. 1 of the drawing.

The handle section 13 is provided with a finger 16 which projects into chamber 3. A bell crank lever is pivotally mounted within the cap 2 and one arm 17 of said lever extends horizontally and is adapted to be engaged by the end of finger 16. The other arm 18 of said crank extends vertically and is adapted to engage the stem of a pilot valve 19. Said valve is contained in a chamber 20 formed in a valve casing secured to the cap 2 and engages a disc 21 which is subject to the pressure of a spring 22. A poppet valve 23 engages the other side of the disc 21 and controls communication from a fluid pressure supply pipe 24 to valve chamber 20.

The valve chamber 20 is connected to a safety control pipe 25 which communicates with a valve device (not shown) adapted upon a reduction in pressure in the control pipe to effect an emergency application of the brakes.

One end of a spring 26 extends into a pocket formed in the bell crank arm 17 and the other end of said spring extends into a pocket formed in the cap 2, said spring acting to force the arm 17 downwardly so as to operate the arm 18 to effect unseating of the valve 19 and seating of the valve 23.

The cap 2 has an opening 27 in one side through which the handle device is adapted to be applied to the operating member 5 and also to permit a limited horizontal movement of the handle device in order to control the brakes on a car.

With the handle applied to the brake valve device and depressed to its normal position, as shown in Fig. 1 of the drawing, the finger 16 rocks the bell crank lever so as to retract the arm 18 from the stem of the pilot valve 19. Spring 22 then acts to seat the pilot valve 19. The pressure of fluid in pipe 24 then unseats the valve 23 so that fluid under pressure is supplied from pipe 24 to chamber 20 and from thence to the safety control pipe 25, thus maintaining the fluid pressure in said pipe to prevent an application of the brakes.

If for any reason the operator should release the handle 13, 13A, the spring 26 acting on the bell crank arm 17 will throw the arm 18 outwardly and cause the valve 23 to be seated and the valve 19 to be unseated. The unseating of valve 19 permits fluid under pressure to be vented from the control pipe 25, whereby an emergency application of the brakes is effected.

It will be noted that the operation of the bell crank lever by spring 26 is dependent upon the release of handle 13, 13A by the operator, since as said bell crank is operated by the spring, the arm 17 acting on finger 16 turns the handle device 13, 13A on the pin 11 thereby raising the outer end of the handle to the release or a safety control position shown in Fig. 2 of the drawing, it being noted that while the tongue 14 engaging in the slot in the yoke 9 provides a rigid connection for operating the brake valve device, it permits this vertical movement of said handle.

If when the operator becomes incapacitated he should fall on the handle 13, 13A or his clothes should catch on the handle and apply to the handle a downwardly acting force, it will be evident that the handle would tend to be held in its depressed position and prevent an emergency application of the brake being effected as above described. According to the invention means are provided to obviate this possibility, as will now be described.

As hereinbefore described, the handle device is made in two sections 13 and 13A, the section 13A being a hand grip section. The section 13 is provided on the end with a tongue 27 which fits into a corresponding slot in the end of the section 13A, and a pin 28 is provided which extends through the tongue 27 and side walls 29 of the slot in the section 13A thereby providing a hinged joint between the portions 13, 13A.

The end of the tongue 27 and the ends of the walls 29 are rounded below the center of the hinge pin 28 in order to permit the handle section 13A to turn downwardly relatively to the handle section 13. Above the pin 28 the end of the tongue 27 and the ends of the walls 29 are squared so as to abut and coact with corresponding surfaces at the bottom of the slot between said walls 29 and at either side of said tongue, respectively, to prevent movement of the handle section 13A relative to the section 13 in an upwardly direction from the normal position, such as shown in Fig. 1.

The handle section 13A is provided with a bore 30 extending longitudinally thereof in substantial alignment with the axis of the hinge pin 28. A plunger 31 is slidably mounted in this bore and a spring 32 contained in said bore acts on the plunger 31 urging same outwardly thereof. A recess 33 is provided in the end of tongue 27 adapted to receive the rounded end of plunger 31 when the handle section 13A is in its normal position with respect to the section 13.

The pressure of spring 32 urges the plunger 31 into engagement with the tongue 27 within the recess 33 with such force as to normally maintain the handle section 13A in rigid working relation to the handle section 13, whereby the two sections of the handle are in effect the equivalent of a solid one piece handle such as heretofore employed.

If, however, the operator should faint or otherwise become incapacitated and fall on the grip section 13A of the handle, or possibly in falling his clothes should catch thereon, the pressure applied to said section will be great enough to push the pin 31 out of the recess 32 against the pressure of spring 30, whereupon the grip section 13A of the handle will turn downwardly relatively to the section 13, and thus become relieved of the pressure which effected such collapse. The spring 26 will then be permitted to act to shift the ports to the position shown in Fig. 3 in which fluid under pressure is vented from the safety control pipe 25 to effect an application of the brakes, as hereinbefore described.

It will now be evident that the invention consists in the provision of a knuckle or hinge joint in a safety control handle which will not interfere with normal operation thereof, but which will permit collapse of the handle under conditions such as above described, in order to ensure an application of the brakes being effected and thus avoid damaging or wrecking of the car.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a safety control device, in combination, a control element, means for urging said element from a depressed position to a safety control position, manual means for holding said element in its depressed position when subjected to manual pressure, and means for permitting movement of said element to its safety control position when said manual means is subjected to an abnormal manual pressure.

2. In a safety control device, in combination, a control element, means for urging said element from a depressed position to a safety control position, manual means for controlling said element, and means for permitting movement of said element to its safety control position upon application of abnormal manual pressure to said manual means and adapted to hold said element in said depressed position when said manual means is subjected to normal manual pressure.

3. In a safety control device, in combination, a control element, means for urging said element from a depressed position to a safety control position, a manual operating member connected to said element and adapted to move relatively thereto to permit said means to act, and means for preventing said relative movement when said member is subjected to a normal manual pressure and for permitting said relative movement when said member is subjected to an abnormal manual pressure.

4. In a safety control device, in combination, an element having a normal position and a safety control position, resilient means acting on said member for urging said member from said normal position to said safety control position, a manual operating member pivotally connected to said element, spring pressed means normally maintaining said member in rigid relation to said element with a force exceeding that of said resilient means on said element whereby a certain manual pressure on said member will hold said element in said normal position, said member when subjected to an abnormal manual pressure being movable relative to said element for relieving said element of manual force, said resilient means being operative upon the relief of manual force on said member to move said element to said safety control position.

5. In a safety control device, in combination, an operated element having a normal position and a safety control position, resilient means for urging said element in the direction from said normal position to said safety control position, a manual operating element having a hinge like connection to said operated element and adapted to move relatively thereto in the opposite direction, means for holding the operated element in rigid relation with said operating element with a predetermined force whereby a certain manual pressure on said operating element will hold said operated element in said normal position, said means being operative to permit movement of said operating element relative to said operated element for relieving said operated element of manual pressure when said operating element is subjected to a pressure exceeding said certain manual pressure, said resilient means being operative upon substantial relief of pressure on said operated element for moving said operated element to said safety control position.

6. In a safety control device, in combination, a control element, resilient means operative to urge said element from a normal position to a safety control position, a manually operated member connected to said control element, means normally maintaining said manually operated member in rigid operating relation with said control element for holding said control element in the normal position when a normal manual pressure is applied to said member, said means being operative when an abnormal manual pressure is applied to said member to permit said member to move relative to said control element and thereby permit said resilient means to urge said element to said safety control position.

7. In a safety control device, in combination, a handle device comprising a section having a normally depressed position and adapted to be moved in an upwardly direction to a safety control position, resilient means for urging said section to the safety control position, a hand grip portion pivotally connected to said section and adapted to be moved by manual pressure in a downwardly direction relative to said section, means associated with said section and grip portion for transmitting manual pressure from said portion to said section for holding said section in said normal position and adapted to permit said relative movement when said grip portion is subjected to an abnormal manual pressure, said resilient means being operative to move said section to said safety control position upon said relative movement of said grip portion.

8. In a safety control device, in combination, a handle device comprising a section having a normally depressed position and adapted to be moved in an upwardly direction to a safety control position, resilient means for urging said section to the safety control position, a hand grip portion having a tongue and groove pivotal connection to said section adapted to prevent movement of the grip portion relative to said section in an upwardly direction but to permit relative movement in a downwardly direction, pressure exerting means associated with said section and portion operative to prevent said relative movement when said hand grip portion is subject to a normal manual pressure so that said normal pressure will move said section to said depressed position, and operative to permit said relative movement if said hand grip portion is subjected to an abnormal manual pressure for relieving said section of pressure opposing the operation of said resilient means to permit said resilient means to move said section to said safety control position.

9. In a safety control device, in combination, a handle device comprising a section having a normally depressed position and adapted to be moved in an upwardly direction to a safety control position, resilient means for urging said section to the safety control position, a hand grip portion having a tongue and groove pivotal connection to said section adapted to prevent movement of the grip portion relative to said section in an upwardly direction but to permit relative movement in a downwardly direction, a movable plunger carried by one part of said pivotal connection and movable into engagement with the other part within a recess, a spring urging said plunger into said recess, the pressure of said spring on said plunger and the engagement of said plunger within said recess providing a connection for moving said section to said depressed position when manual pressure is applied to said hand grip portion and operative if said grip portion is subjected to an abnormal manual pressure to permit said grip portion to move downwardly relative to said section and thereby relieve said section of manual pressure to permit said resilient means to move said section to said safety control position.

10. In a safety control device, in combination, a safety control handle, means for urging said handle to a safety control position, said handle being movable to a normal position by manual pressure, and means for permitting movement of said handle to the safety control position upon the application of an abnormal manual pressure to said handle.

11. In a safety control apparatus, in combination, an element, means operative upon rotation of said element to effect an application of the brakes on a vehicle, a member having a tongue and groove connection with said element for turning said element and rotatable relative to said element in a direction at right angle to the direction of movement of said element from a normal position to a safety control position, means operative upon movement of said member to said safety control position for effecting an application of the brakes, resilient means for rotating said member relative to said element, manual means for turning said member and thereby said element and operative to hold said member in said normal position when subject to a normal manual pressure, and means for permitting movement of said member to said safety control position when said manual means is subjected to an abnormal manual pressure.

12. In a safety control apparatus, in combination, means including an element adapted to be rotated in a horizontal plane for controlling the brakes on a vehicle, a member having a tongue and groove connection with said element for turning said element and having a pivotal connection with said element for permitting movement of said member relative to said element in an upwardly direction from a normal depressed position to a safety control position, valve means operative to effect an application of the brakes, resilient means for urging said member to said safety control position and for simultaneously effecting the operation of said valve means, a handle having a tongue and groove connection with said member for operating said member to turn said element, and having a pivotal connection with said member for permitting movement thereof in a downwardly direction relative to said member, and means for preventing movement of said handle relative to said member when the manual pressure applied to said handle is normal and for permitting movement of said handle relative to said member when the manual pressure applied to said handle is abnormal.

13. In a safety car control apparatus for a vehicle, in combination, an element adapted to be rotated for controlling the brakes on the vehicle, an operating member movably mounted on said element so as to permit depression and elevation of said member relative to said element, said member having a tongue and groove connection with said element, means operable upon movement of said member to an elevated position for effecting a safety control application of the brake, a handle member operatively connected to said operating member and operated by manual pressure to hold said operating member in its depressed position, and means for permitting movement of said operating member to its elevated position upon the application of an abnormal pressure to said handle member.

GEORGE C. FARMER.